United States Patent
Dickinson et al.

(10) Patent No.: US 8,364,369 B2
(45) Date of Patent: Jan. 29, 2013

(54) LOW RANGE DRIVE RATIO TRANSFER CHANGEOVER ANTI-ROLLBACK SYSTEM AND METHOD

(75) Inventors: Michael Thomas Dickinson, Hilliard, OH (US); Andrew J. Fox, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 12/847,828

(22) Filed: Jul. 30, 2010

(65) Prior Publication Data

US 2012/0029781 A1    Feb. 2, 2012

(51) Int. Cl.
G06F 7/70 (2006.01)
G06F 19/00 (2011.01)
G06G 7/00 (2006.01)
G06G 7/76 (2006.01)
G06F 7/00 (2006.01)

(52) U.S. Cl. .......................... 701/70; 701/36
(58) Field of Classification Search .................. None
See application file for complete search history.

(56) References Cited

U.S. PATENT DOCUMENTS

| | | | |
|---|---|---|---|
| 4,601,359 A | 7/1986 | Weismann et al. | |
| 4,630,704 A | 12/1986 | Yamakawa et al. | |
| 4,644,826 A * | 2/1987 | Kubo et al. | 477/95 |
| 4,768,609 A | 9/1988 | Taga et al. | |
| 4,955,848 A | 9/1990 | Kotajima | |
| 4,974,473 A | 12/1990 | Hatakeyama | |
| 5,020,626 A | 6/1991 | Kodama | |
| 5,054,335 A | 10/1991 | Andrews | |
| 5,056,614 A | 10/1991 | Tokushima et al. | |
| 5,135,071 A | 8/1992 | Shibahata et al. | |
| 5,411,110 A | 5/1995 | Wilson et al. | |
| 5,728,022 A | 3/1998 | Schultz | |
| 5,931,252 A * | 8/1999 | Shimizu et al. | 180/204 |
| 5,989,146 A | 11/1999 | Brown et al. | |
| 6,042,504 A | 3/2000 | Gualtieri et al. | |
| 6,056,666 A | 5/2000 | Williams | |
| 6,064,934 A | 5/2000 | Zhang | |
| 6,086,515 A | 7/2000 | Buschmann et al. | |
| 6,095,276 A | 8/2000 | Kuroda et al. | |
| 6,105,703 A | 8/2000 | Kuroda et al. | |
| 6,213,242 B1 | 4/2001 | Rodrigues et al. | |

(Continued)

FOREIGN PATENT DOCUMENTS

DE    4409224 A1    10/1994
WO    2008/016537 A2    2/2008

*Primary Examiner* — Paul Danneman
(74) *Attorney, Agent, or Firm* — Kenealy Vaidya LLP

(57) ABSTRACT

A vehicle anti-rollback system and method can be incorporated into a vehicle that includes a pair of front wheels, a pair of rear wheels, a power unit, and a transmission connecting the power unit to at least one wheel of the front and rear wheels. The transmission can include a plurality of forward drive ratios and at least one reverse drive ratio and a two speed final drive ratio transmission configured to select between a high range drive ratio and a low range drive ratio when the transmission is in one of the plurality of forward drive ratios. A controller can be provided that senses a vehicle rollback condition. When the rollback condition is detected, the controller can decrease torque distributed from the power unit of the vehicle to the at least one wheel, and can actuate a brake. While the vehicle is braked and torque transfer is reduced, the controller can execute drive ratio changeover in a stable manner from the high range drive ratio to the low range drive ratio.

20 Claims, 4 Drawing Sheets

U.S. PATENT DOCUMENTS

| | | |
|---|---|---|
| 6,251,045 B1 | 6/2001 | Oliveira et al. |
| 6,549,840 B1 | 4/2003 | Mikami et al. |
| 6,579,208 B2 | 6/2003 | Oliveira et al. |
| 6,697,725 B1 | 2/2004 | Williams |
| 6,725,989 B1 | 4/2004 | Krisher et al. |
| 6,814,682 B2 | 11/2004 | Spitale |
| 6,848,555 B2 | 2/2005 | Sakata et al. |
| 6,942,592 B1 | 9/2005 | Haka |
| 7,004,874 B2 | 2/2006 | Mizon et al. |
| 7,021,445 B2 | 4/2006 | Brissenden et al. |
| 7,062,984 B2 | 6/2006 | Haka |
| 7,086,987 B2 | 8/2006 | Janson et al. |
| 7,136,735 B2 | 11/2006 | Carlson et al. |
| 7,217,209 B2 | 5/2007 | Saito et al. |
| 7,343,998 B2 | 3/2008 | Morin et al. |
| 7,349,776 B2 | 3/2008 | Spillane et al. |
| 7,442,148 B2 | 10/2008 | Eckle et al. |
| 7,455,134 B2 | 11/2008 | Severinsky et al. |
| 7,458,917 B2 | 12/2008 | Yoshikawa et al. |
| 7,549,497 B2 | 6/2009 | Homan et al. |
| 2003/0211913 A1 | 11/2003 | Spitale |
| 2004/0029673 A1 | 2/2004 | Lipman |
| 2004/0099459 A1 | 5/2004 | Nakasako et al. |
| 2005/0004732 A1 | 1/2005 | Berry et al. |
| 2005/0017580 A1* | 1/2005 | Cikanek et al. ............... 303/191 |
| 2005/0087380 A1* | 4/2005 | Brown ......................... 180/233 |
| 2006/0111823 A1 | 5/2006 | Tamai |
| 2007/0010927 A1 | 1/2007 | Rowley et al. |
| 2007/0049451 A1 | 3/2007 | Mizon et al. |
| 2007/0093347 A1 | 4/2007 | Janson et al. |
| 2007/0096557 A1 | 5/2007 | Tamai et al. |
| 2007/0219695 A1 | 9/2007 | Chiu et al. |
| 2007/0299581 A1 | 12/2007 | Torralbo et al. |
| 2008/0046158 A1 | 2/2008 | Carey et al. |
| 2009/0032359 A1 | 2/2009 | Asano |
| 2009/0032360 A1 | 2/2009 | Asano |
| 2009/0099762 A1 | 4/2009 | Heinzmann et al. |

* cited by examiner and a high range position where the actuator couples the high range drive ratio in series with the selected one of the plurality of forward drive ratios. The system can include a vehicle power unit connected to the multi-ratio transmission, a vehicle speed sensor, a vehicle acceleration sensor, and a controller in electrical communication with each of the actuator, the vehicle speed sensor and the vehicle acceleration sensor. The controller can be configured to sense a vehicle rollback condition according to a set of predetermined parameters including data from the vehicle speed sensor and the vehicle acceleration sensor, and cause a reduction in torque transfer from the power unit to the at least one vehicle wheel and actuate a vehicle brake system when the vehicle rollback condition is sensed.

According to another aspect of the disclosed subject matter a vehicle anti-rollback system can include a two-speed gear reduction assembly in series with a multi-ratio transmission assembly of the vehicle and at least one vehicle wheel, the two-speed gear reduction assembly including a low range drive ratio and a high range drive ratio, and the multi-ratio transmission assembly including a reverse drive ratio and a plurality of forward drive ratios. The system can also include an actuator selectively movable between a low range position where the actuator couples the low range drive ratio in series with a selected one of the plurality of forward drive ratios and a high range position where the actuator couples the high range drive ratio in series with the selected one of the plurality of forward drive ratios; a vehicle power unit connected to the multi-ratio transmission assembly. At least one vehicle parameter sensor can be provided. A controller can be in electrical communication with the vehicle parameter sensor and configured to sense a vehicle rollback condition, according to data received from the parameter sensor, in which the controller determines that the vehicle is likely to roll backwards while the multi-ratio transmission assembly is engaged in one of the plurality of forward drive ratios. The controller can be configured to cause a reduction in torque transfer from the power unit to the at least one vehicle wheel and actuate a vehicle brake system when the vehicle rollback condition is sensed, and to cause the actuator to move to the low range position when the vehicle rollback condition is sensed and the controller has reduced torque transfer from the power unit to the at least one vehicle wheel and has actuated the vehicle brake system.

LOW RANGE DRIVE RATIO TRANSFER CHANGEOVER ANTI-ROLLBACK SYSTEM AND METHOD

BACKGROUND

1. Field

The presently disclosed subject matter relates to devices, systems, and processes useful for executing a drive ratio changeover and reducing rollback in a vehicle, particularly, reducing rollback when a vehicle transfers from a high to a low range.

2. Description of the Related Art

Drive ratio changeover can occur during circumstances when a vehicle would run more efficiently at a lower or higher drive range ratio. These drive ratio changeovers can be executed manually by a vehicle operator. Often a drive ratio changeover will be necessary during ascent of an inclined road, and often times can occur when the vehicle is towing cargo. As the need for drive force increases, a changeover from a high range drive ratio to a low range drive ratio is often beneficial. However, conventionally, during this changeover the vehicle tends to momentarily slip or roll backwards commensurate with the slope of the roadway or other vehicle operating conditions.

Vehicle rollback during drive range changeover is generally undesirable as it can affect the driver who may momentarily feel a loss of control over the vehicle. Additionally, rollback can be particularly undesirable in situations where a heavy load is being towed by the vehicle or, for example, the vehicle is climbing a boat ramp. The following disclosure provides a system and control method for executing a drive ratio changeover when ascending a steep slope without rollback.

SUMMARY

According to one aspect of the disclosed subject matter, a vehicle anti-rollback method can include providing a vehicle that includes a pair of front wheels, a pair of rear wheels, a power unit, and a transmission connecting the power unit to at least one wheel of the front and rear wheels. The transmission can include a plurality of forward drive ratios and at least one reverse drive ratio and a two speed final drive ratio transmission configured to select between a high range drive ratio and a low range drive ratio when the transmission is in one of the plurality of forward drive ratios. The method can include sensing a vehicle rollback condition when the vehicle transmission is configured in a forward drive ratio, decreasing torque distributed from the power unit of the vehicle to the at least one wheel, and actuating a brake, when the rollback condition is sensed, executing drive ratio changeover from the high range drive ratio to the low range drive ratio after the decreasing of the torque and actuating of the brake, and increasing torque distributed from the power unit of the vehicle to the at least one wheel and releasing the brake after the low range drive ratio has been engaged.

According to another aspect of the disclosed subject matter a vehicle anti-rollback system can include a two-speed gear reduction assembly in series with a multi-ratio transmission assembly of the vehicle and at least one vehicle wheel. The two-speed gear reduction assembly can include a low range drive ratio and a high range drive ratio, and the multi-ratio transmission assembly can include a reverse drive ratio and a plurality of forward drive ratios. An actuator can be selectively movable between a low range position where the actuator couples the low range drive ratio in series with a selected one of the plurality of forward drive ratios and a high range

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
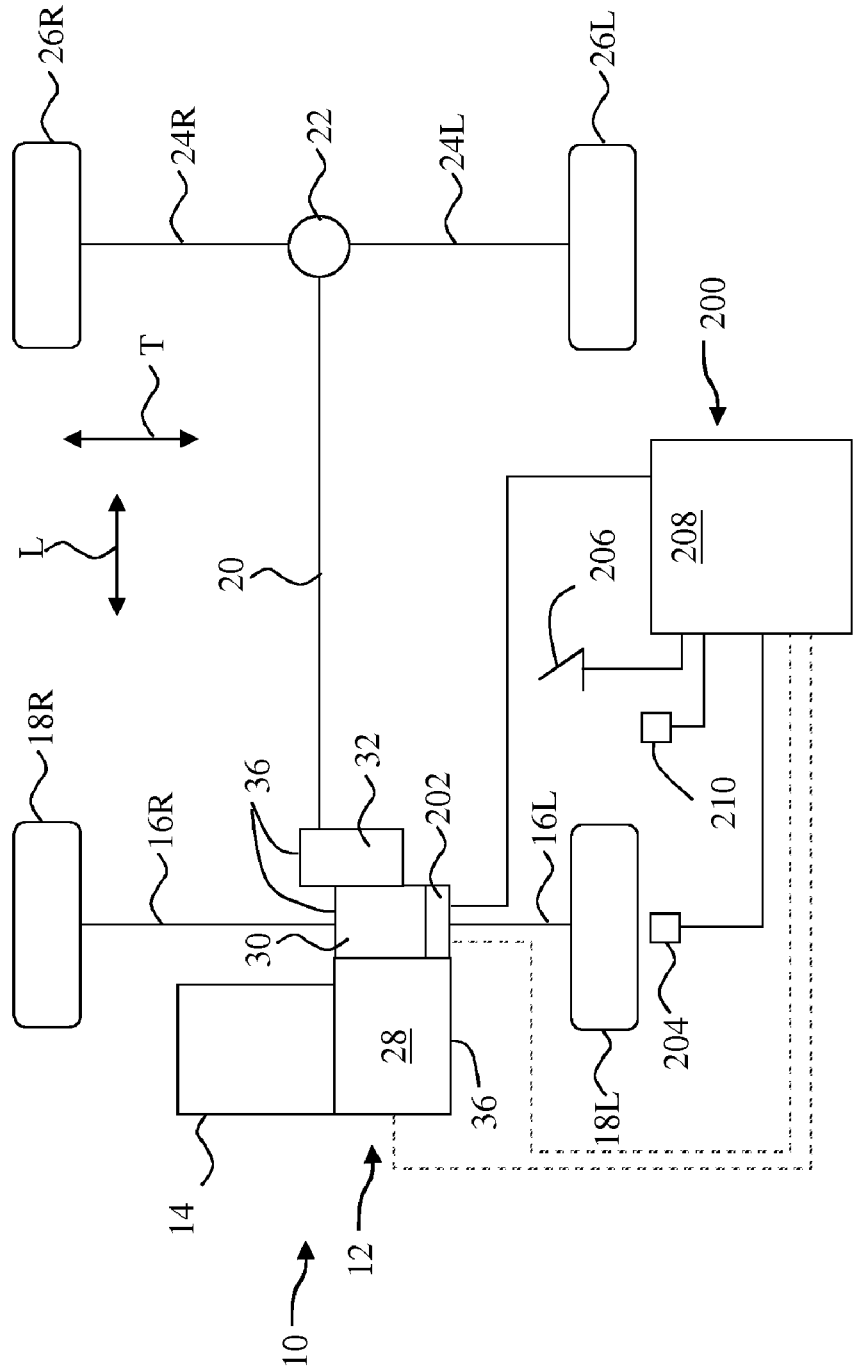
FIG. 1 is a schematic view of an exemplary configuration of a powertrain and a control system of a vehicle.

FIG. 1 is a schematic view of a powertrain of a vehicle 10 that includes a control system 200. The control system 200 can select the appropriate one of a low range drive ratio and a high range drive ratio without direct input from the driver of the vehicle. That is, the control system 200 can cause a shift between the low range drive ratio and the high range drive ratio without the driver of the vehicle moving a gear shift lever or pushing an electrical switch mounted in the driver area of the passenger compartment.

The vehicle 10 can include a power source, such as an internal combustion engine 14 and a drivetrain driven by the internal combustion engine 14. The drivetrain can be configured as a two-wheel drivetrain, a four-wheel drivetrain, or an all-wheel drivetrain and can include a transaxle 12, a pair of front driveshafts 16L, 16R, a pair of front wheels 18L, 18R, a propeller shaft 20, a rear differential assembly 22, a pair of rear driveshafts 24L, 24R, and a pair of rear wheels 26L, 26R.

Each of the driveshafts 16L, 16R, 24L, 24R can extend in a transverse direction (indicated by arrows T) of the vehicle 10. The rear driveshafts 24L, 24R can be spaced from the front driveshafts 16L, 16R in a longitudinal direction (indicated by arrows L) of the vehicle 10—which direction is perpendicular to the transverse direction T. Each of the front driveshafts 16L, 16R can be connected to and driven by the transaxle 12. Each of the rear driveshafts 24L, 24R can be connected to and driven by the rear differential 22.

The left front wheel 18L can be connected to and driven by the left front driveshaft 16L. The right front wheel 18R can be connected to and driven by the right front driveshaft 16R. The left rear wheel 26L can be connected to and driven by the left rear driveshaft 24L, and the right rear wheel 26R can be connected to and driven by the right rear driveshaft 24R.

Each of the internal combustion engine 14 and the transaxle 12 can be oriented with their output shafts (not shown) in the transverse direction T of the vehicle 10. However, this orientation can be varied without departing from the scope of the disclosed subject matter, and can include a perpendicular orientation between the engine output shaft and transaxle output shaft. The internal combustion engine 14 can be connected to the transaxle 12 to drive the transaxle 12 in a manner known in the art.

The propeller shaft 20 can extend in the longitudinal direction L of the vehicle 10 and can be connected to each of the transaxle 12 and the rear differential assembly 22. The propeller shaft 20 can be driven by the transaxle 12 and can drive the rear differential assembly 22.

The transaxle 12 can include a multi-ratio transmission 28, a two-speed final drive assembly 30 and a power take-off assembly 32. The transaxle 12 can be configured such that it is accommodated within the engine compartment of the vehicle 10. Accordingly, the passenger compartment of the vehicle 10 need not accommodate the transaxle 12. Co-pending U.S. patent application Ser. No. 12/847,639, entitled "Transversely Mounted Transaxle Having A Low Range Gear Assembly and Powertrain for A Vehicle Including Same", and Co-pending U.S. patent application Ser. No. 12/847,673, entitled "Control System and Method for Automatic Selection of Low Range Gear Ratio for Vehicle Drive Train," both filed concurrently herewith and incorporated herein by reference, disclose details of an exemplary embodiment of the transaxle 12.

The multi-ratio transmission 28 can be connected to and driven by the internal combustion engine 14 in a manner that is known in the art. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatic transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The two-speed drive assembly 30 can be driven by the multi-ratio transmission 28 and can drive each of the front driveshafts 16L, 16R and the power take-off assembly 32 based on a selected one of a high range drive ratio and a low range drive ratio. Each of the high range drive ratio and the low range drive ratio can be selected independent of the ratio selected in the multi-ratio transmission 28. That is, the two-speed drive assembly 30 can provide the selected one of the high range drive ratio and the low range drive ratio in series with any one of the reverse speed ratio and the forward speed ratios selected in the multi-ratio transmission 28. The two-speed drive assembly 30 can include a high range gearing assembly that corresponds to the high range drive ratio and a low range gearing assembly that corresponds to the low range drive ratio. The high range gearing can be used for normal driving conditions, such as driving on a level surface, driving at highway speeds, driving on a dry road, etc. The low range gearing can be used for special driving conditions, such as driving on low traction surfaces, off-road driving, towing a trailer on an inclined surface at low speeds, starting from a stop with a trailer attached to the vehicle 10, etc. Selection of the high range gearing and the low range gearing can be performed automatically by the control system 200, as will be discussed in detail below.

Each of the low range gearing and the high range gearing can be provided by respective combinations of meshing gears, such as those disclosed in the above-reference co-pending U.S. patent application Ser. No. 12/847,639. However, other known combinations of meshing gears can be used to provide a respective one of the low range gearing and the high range gearing.

The transaxle 12 can include a housing 36 in which the multi-ratio transmission 28 and a front differential (not shown) for the front wheels 18R, 18L are mounted, as is known in the art. See, for example, U.S. Pat. No. 4,974,473, referenced above. The housing 36 can also contain the two-speed drive assembly 30 and the power take-off assembly 32.

The control system 200 can include an actuator 202, a vehicle speed sensor 204, an accelerator pedal position sensor 206 and an electronic control unit (ECU) 208 in electrical communication with each of the actuator 202, the vehicle speed sensor 204 and the accelerator pedal position sensor 206. Based on signals received from each of the sensors 204, 206, the ECU 208 can output a control signal to the actuator 202 to move the actuator 202 between a low range position where the actuator 202 couples the low range drive ratio in series with a selected one of the reverse drive ratio and the plurality of forward drive ratios, and a high range position where the actuator 202 couples the high range drive ratio in series with the selected one of the reverse drive ratio and the plurality of forward drive ratios.

The actuator 202 can include any known actuator, such as an electrical actuator, a magnetic actuator, an electro-mechanical actuator, an electro-magnetic-mechanical actuator or an electro-hydraulic actuator. The actuator 202 can be coupled to a clutch (not shown) or other known torque transmission coupling device. The clutch can cause engagement of the selected one of the low range drive ratio and the high range drive ratio in series with the selected one of the reverse drive ratio and the plurality of forward drive ratios. The actuator 202 can be a component of the two-speed drive assembly 30 and at least the clutch can be mounted within the housing 36, as is disclosed in the above-referenced co-pending U.S. patent application Ser. No. 12/847,639.

The vehicle speed sensor 204 can be a wheel speed sensor, a shaft speed sensor, or other known sensor capable of measuring data usable to determine the real-time travel speed of the vehicle. For example, the vehicle speed sensor 204 could be a sensor used to obtain data for a speedometer.

The accelerator pedal position sensor 206 can be any known sensor capable of measuring movement and/or the relative location of an accelerator pedal of the vehicle. For example, the accelerator pedal position sensor can be a sensor used in a vehicle drive-by-wire system that can control the speed of the internal combustion engine 14.

The ECU 208 can be referred to as a central processing unit (CPU) or as a controller. The ECU 208 can be dedicated to the two-speed drive assembly. Alternatively, the ECU 208 can control the multi-ratio transmission 28 and/or the internal combustion engine 14 in addition to the two-speed drive assembly 30. If the ECU 208 is dedicated to the two-speed drive assembly, then the ECU 208 can be in electrical communication with an ECU(s) for the internal combustion engine 14 and/or the multi-ratio-transmission 28.

The control system 200 can further include a manual override switch 210 in electrical communication with the ECU 208. The manual override switch 210 can enable the driver to disable automatic control of the actuator 202 by the ECU 208 and cause the actuator 202 to move to the low range position and engage the low range drive ratio. In addition, the override switch 210 can include another position that overrides the ECU 208 and causes the actuator 202 to move to the high range position and engage the high range drive ratio (thus, permitting the drivetrain to operate in the low range drive ratio only when either manually actuated by the override switch 210 or automatically actuated when the override switch 210 is placed back to the automatic position).

The ECU 208 can be configured with hardware alone, or to run software, that permits the ECU 208 to receive, store and process data from the sensors. The ECU 208 can be configured with hardware alone, or to run software, that calculates the real-time vehicle acceleration based on real-time vehicle speed data provided to the ECU 208 by the vehicle speed sensor 204. Alternatively, the vehicle speed sensor 204 could be a smart sensor configured with hardware alone, or to run software, that calculates the real-time vehicle acceleration and outputs the acceleration data to the ECU 208.

Although the exemplary embodiment depicted by FIG. 1 can rely on vehicle speed, accelerator pedal position, and vehicle acceleration as inputs for the selection between the low range drive ratio and the high range drive ratio, other vehicle operation parameters can be used as inputs, such as torque converter slippage, longitudinal orientation of vehicle, transmission fluid temperature, estimated engine torque, etc. These other parameters can be used in addition to, or in place of, any combination of the vehicle speed, the accelerator pedal position, and the vehicle acceleration.

Figure 2:
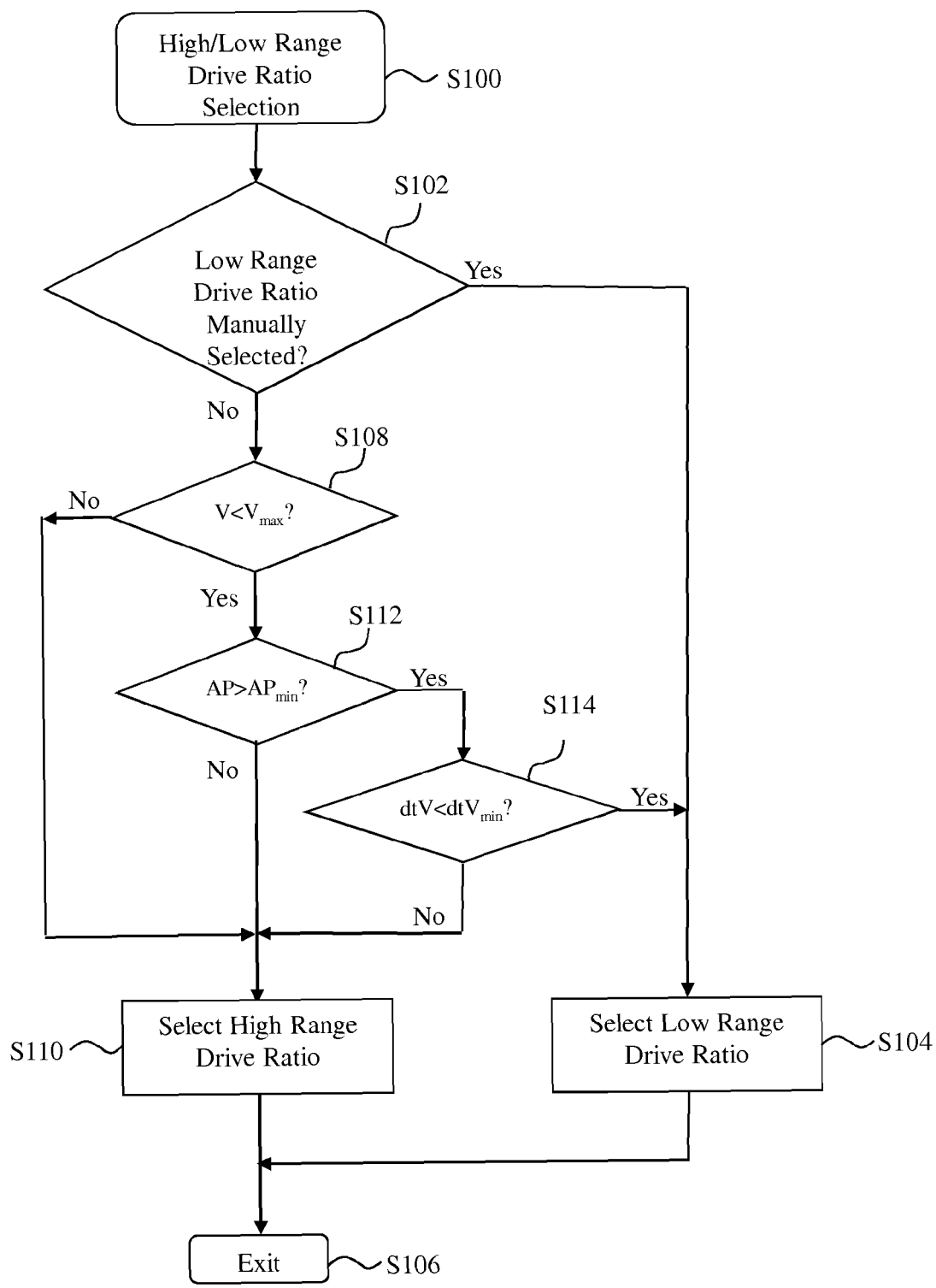
FIG. 2 is a flowchart useable by the control system of FIG. 1.

The ECU 208 can automatically select, without direct input from the driver, which one of the low range drive ratio and the high range drive ratio may be best suited for the given vehicle operation parameters. A subroutine built into the hardware or executed when running the software can be based on a flowchart illustrated in FIG. 2.

The subroutine can begin at step S100. At step S102, the ECU 208 determines if the driver has disabled the automatic selection of the low range drive ratio and the high range drive ratio via the manual override switch 210. If the manual override switch 210 is selected (i.e., placed in the ON position), then the subroutine proceeds to step S104. In step S104, the ECU 208 selects the low range drive ratio. The ECU 208 then proceeds to step S106 of the subroutine where the subroutine can end or go on to further processing steps to determine whether the current selection of drive ratio is continually appropriate.

If the manual override switch 210 is activated by the driver, the ECU 208 can follow another subroutine where the ECU 208 determines if it is not advantageous to permit manual engagement. Additionally, or alternatively, the ECU 208 can be configured to determine whether to disengage the low range drive ratio after it has been directly selected by the driver via the manual override switch 210.

The selection of the low range drive ratio can be carried to another subroutine where a decision can be made by the ECU 208 whether to signal the actuator 202 to move to the low range position. For example, the ECU 208 can be configured to collect data indicating the current position of the actuator 202 and comparing the current position to the position corresponding to the selection made at step S104 and determining when changeover from high range drive ratio to low speed drive ratio is imminent. Alternatively, as part of step S104, the ECU 208 can signal the actuator 202 to move to the low range position, regardless of its current position.

If the ECU 208 determines at step S102 that the manual override switch 210 is not selected (i.e., placed in the OFF position), then the ECU 208 proceeds to step S108 of the subroutine. Step S108 can be useful for shift-on-the-fly capability for the control system 200. At step S108, the ECU 208 compares the data representing the real-time vehicle speed provided by the vehicle speed sensor 204 with a maximum or threshold vehicle speed. The maximum vehicle speed can be set at a value that can ensure a shift between the low range drive ratio and the high range drive ratio that may not adversely affect the drivetrain components (e.g., synchronizers, gears, shafts, etc.) or the stability of the vehicle while it is in motion. If the real-time vehicle speed is at least equal to the maximum vehicle speed, then the vehicle may be travelling too fast to shift to the low range drive ratio. Also, the vehicle may be travelling too fast to take advantage of the utility offered by the low range drive ratio. Accordingly, the ECU 208 proceeds to step S110, where the high range drive ratio is selected. The ECU 208 can then proceed to step S106 of the subroutine where the subroutine ends (or can go to further control or monitoring processing steps).

As with the low range drive ratio selection, the selection of the high range drive ratio can be carried to another subroutine where a decision can be made whether to signal the actuator to move to the high range position. Alternatively, as part of step S110, the ECU 208 can signal the actuator 202 to move to the high range position, regardless of its current position.

If the ECU 208 determines at step S108 that the real-time vehicle speed is less than the maximum vehicle speed, then the vehicle may be travelling at a speed suitable for shifting to the low range drive ratio. The ECU 208 can then proceed to step S112.

At step S112, the ECU 208 compares the data communicated by the accelerator pedal position sensor 206 (representing the position of the accelerator pedal) to a minimum accelerator pedal position. For example, the accelerator pedal (not shown) can have a position that falls between an idle position where the internal combustion engine 14 operates under a minimum consumption fuel and air and produces a minimum power output, and a wide-open throttle position where the internal combustion engine 14 operates under a maximum consumption of fuel and air. In general, each incremental position of the accelerator pedal between the idle position and the wide-open throttle position corresponds to a specific torque/power output value for the internal combustion engine 14. A minimum accelerator position can be selected from this range of accelerator positions that corresponds to a minimum torque/power output of the internal combustion engine 14 that can be useful in combination with the low range drive ratio.

Instead of measuring the position of the accelerator pedal, the accelerator pedal position sensor could measure the position of an engine throttle valve (not shown) that is mechanically coupled to the accelerator pedal, as is known in the art. In this exemplary embodiment, the engine throttle valve can move between an idle position and a wide-open throttle position that correspond, respectively, to the torque/power outputs of the internal combustion engine 14 described above.

If the accelerator pedal position lies between the idle position and the minimum accelerator pedal position, then the load on the internal combustion engine 14 may not be sufficient to take advantage of the low range drive ratio. Accordingly, the ECU 208 can then proceed to step S110 where the ECU 208 selects the high range drive ratio. The ECU 208 then can proceed to step S106 of the subroutine where the subroutine can end.

If the accelerator pedal position is greater than the minimum or threshold accelerator pedal position, then the load on the internal combustion engine 14 may be sufficient to take advantage of the utility of the low range drive ratio. Accordingly, the ECU 208 can proceed to step S114 of the subroutine.

At step S114, the ECU 208 compares the real-time vehicle acceleration with a maximum or threshold vehicle acceleration. The maximum acceleration can be independent of the minimum accelerator position or the maximum acceleration can correspond to the minimum accelerator pedal position. This comparison can be useful to determine if the engine load suggested by the accelerator pedal position sensor 206 would benefit from the low range drive ratio. That is, if the vehicle acceleration is less than the maximum vehicle acceleration despite an accelerator pedal position indicative of a high torque/power output for the internal combustion engine 14, then the low range drive ratio may be advantageous.

If at step S114 the ECU 208 determines that the vehicle acceleration is less than the maximum acceleration, the ECU 208 proceeds to step S104 where the ECU selects the low range drive ratio. Then, the ECU 208 can proceed to step S106 of the subroutine where the subroutine can end.

If the ECU 208 determines at step S104 that the real-time vehicle acceleration is at least equal to the maximum acceleration, then the ECU 208 proceeds to step S110 where the ECU 208 selects the high range drive ratio. Thus, the actual vehicle performance substantially corresponds to an expected performance and the high range drive ratio can provide the most advantageous drivetrain performance with respect to power output and fuel consumption.

The ECU 208 can be configured to store the maximum vehicle speed, the minimum accelerator pedal position and the maximum vehicle acceleration. Alternatively, these values can be stored in an electronic memory component (not shown) that is external to, and in electrical communication with, the ECU 208.

Figure 3:
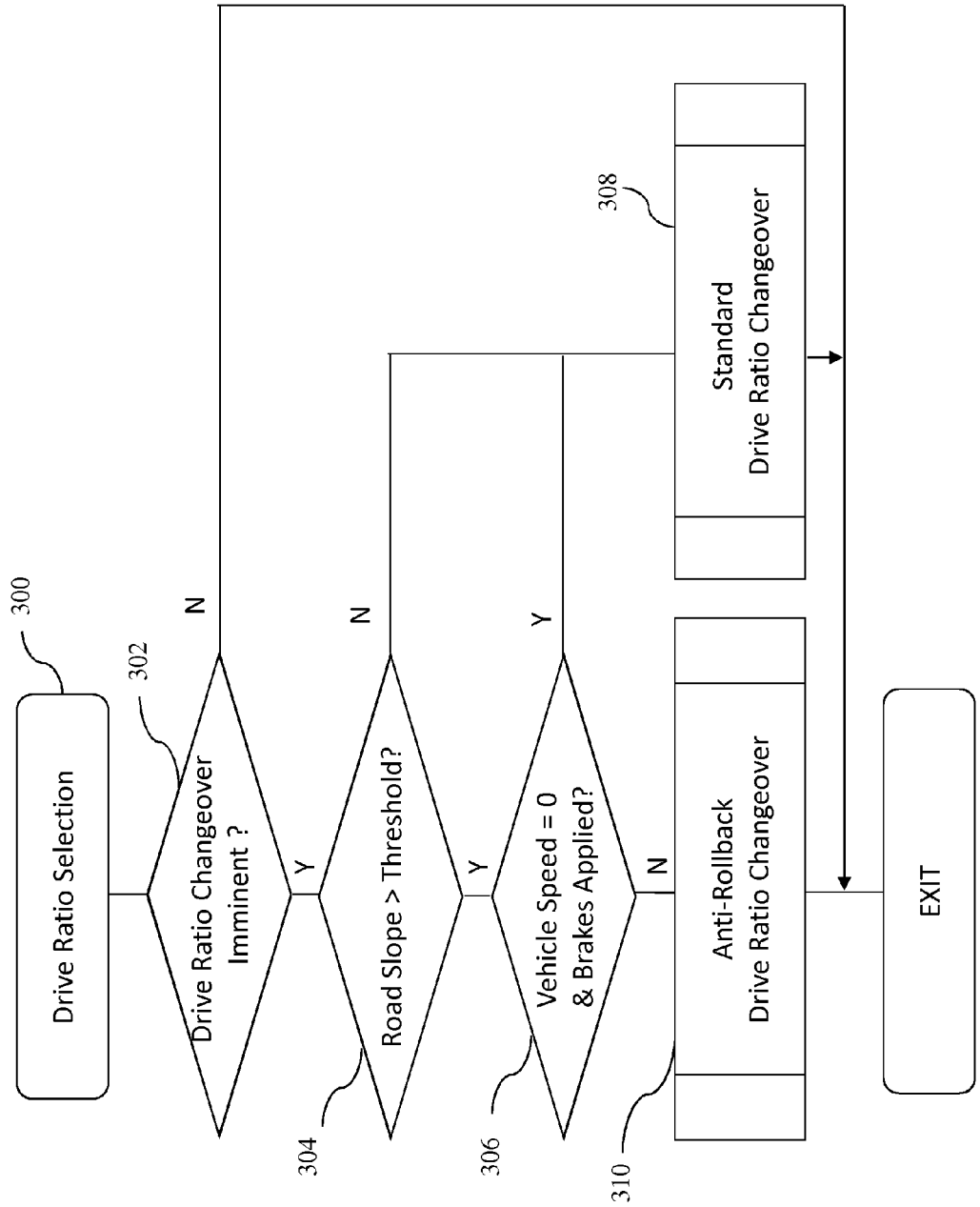
FIG. 3 is a flowchart illustrating an exemplary control method incorporating anti-rollback during drive ratio changeover in a vehicle.

FIG. 3 is a flow chart that illustrates an exemplary control method incorporating an anti-rollback feature during drive ratio changeover in a vehicle. The ECU 208 can automatically select, at step 300, which drive ratio (low or high range) may increase driving efficiency given a predetermined set of vehicle operation parameters. After a drive ratio is selected, the ECU 208 can monitor these predetermined vehicle operation parameters and evaluate when a drive ratio changeover may be imminent at step 302. If a drive ratio changeover is not imminent then the ECU 208 will not commence any anti-rollback operation, but instead will continue to monitor vehicle operation parameters in the event of imminent drive ratio changeover.

If the ECU 208 detects that a drive ratio changeover is imminent, the ECU 208 can then proceed with determining the slope of the roadway presently supporting the vehicle. The determined road slope is then compared to a predetermined slope threshold at step 304. The predetermined slope threshold may vary according to vehicle operating conditions and/or varying vehicle specifications. If the road slope is less than the threshold, then vehicle rollback is unlikely and the ECU 208 can automatically proceed with a standard drive ratio changeover at step 308, for example, from a high to a low range drive ratio.

If the measured and present road slope is greater than the predetermined threshold for road slope at step 304, then the ECU 208 can be configured to determine that it is likely that the vehicle may experience rollback. The ECU 208 may then determine if the vehicle speed is substantially equal to zero and if the brakes have been applied at step 306. If the vehicle speed is equal to zero and the brakes have been applied at step 306, then the ECU 208 can proceed with a standard drive ratio changeover because rollback is not likely.

However, if the vehicle speed does not equal zero and the brakes have not been applied at step 306, then the ECU 208 can determine that rollback is likely to occur and can then engage anti-rollback drive ratio changeover features at step 310. For example, the engine torque can be reduced by operation of the ECU 208 and the brakes can be applied so as to controllably bring the vehicle to a stop. The ECU 208 can then execute a changeover command in which the switch from the high range drive ratio to the low range drive ratio is accomplished. After the switch is accomplished, the ECU 208 can re-apply engine torque and cause the brakes to release. Additionally, other predetermined parameters can be evaluated by the ECU 208 when determining the likelihood of vehicle rollback. Some of these parameters may include the speed of the vehicle, vehicle load, variable slippage between individual wheels detected by the ECU 208 can also be used to determine the likelihood of rollback, as well as other features. Other combinations of parameters monitored by the ECU 208 can also be used in determining potential rollback, for example, vehicle speed compared to exerted engine torque, and steering angle of the vehicle as compared to the actual linear movement of the vehicle.

Figure 4:
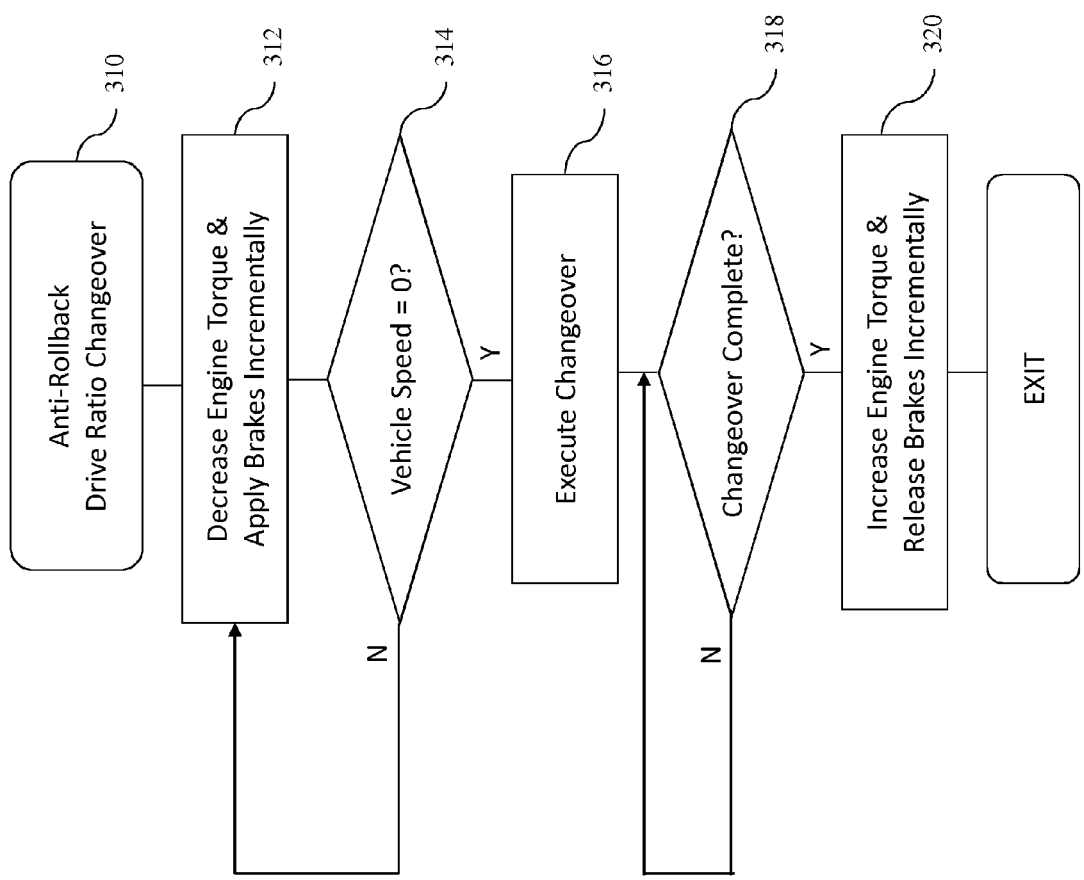
FIG. 4 is a flow chart illustrating an exemplary control method for executing anti-rollback during drive ratio changeover in a vehicle.

FIG. 4 is a flow chart that illustrates in more detail an exemplary anti-rollback drive ratio changeover feature that can be automatically initiated by the ECU 208. Once the anti-rollback drive ratio changeover feature has been engaged at step 310 the ECU 208 will decrease the engine torque through actuation of a clutch, and incrementally apply the brakes at step 312 in order to slowly and methodically bring the vehicle to a stop. The ECU 208 can then continuously or intermittently monitor the vehicle speed and determine when the vehicle speed equals zero at step 314. The ECU 208 can continue to reduce the engine torque and apply the brakes until the vehicle comes to a substantial stop.

Once the vehicle has stopped the ECU 208 can then automatically execute the drive ratio changeover at step 316, for example, from high range to low range drive ratio. Alternatively, the drive ratio changeover can be performed manually, while still utilizing the anti-rollback changeover sequence. The ECU 208 can be configured to monitor when the changeover is complete at step 318. Upon completion of the drive ratio changeover, the ECU 208 can then engage the clutch to increase the engine torque and release the brakes in an incremental manner.

In another exemplary anti-rollback changeover configuration, the ECU 208 may alert the driver of the vehicle that the anti-rollback changeover has been automatically initiated by a visual and/or audio warning message within the vehicle. Likewise, a similar visual and/or audio warning message may be initiated by the ECU 208 upon completion of the execution of the anti-rollback changeover. It should be noted that although the processes are described in a particular order, the use of the term "step" should not be considered to require that the process be executed in this order or any other strict chronological or numerical order. Moreover, the numbered steps described above can be executed in a different order while remaining within the spirit and scope of the presently disclosed subject matter.

While step 314 indicates that the vehicle speed is zero (0) in order to proceed to the execution of changeover step at 316, this value can be different, for example, less than 5 miles per hour, or other reduced speed value. The disclosed subject matter can also be accomplished in a non-incremental manner, and can be configured as an emergency type system that quickly and efficiently locks the brakes when a rollback condition is sensed. The amount of incremental locking of the brakes and reduction of engine torque can be determined for each specific vehicle. Engine torque can also be reduced or uncoupled immediately upon determination of a rollback condition. In addition, although it is possible to reduce and re-apply engine torque through the use of the clutch system as described above, other systems and components are also contemplated for us in achieving these functions. For example, engine torque could be reduced or re-applied by configuring the ECU 208 to reduce/increase the throttle position, to retard/change the ignition timing, re-route torque through another system such as a battery charger, etc.

Although certain distinct embodiments are disclosed, the components of each of the disclosed embodiments can be added to or interchanged with other similar components of the various other embodiments.

While the subject matter has been described in detail with reference to exemplary embodiments thereof, it will be apparent to one skilled in the art that various changes can be made, and equivalents employed, without departing from the scope of the invention. All related art references described above are hereby incorporated by reference in their entirety.

What is claimed is:

1. A vehicle anti-rollback method, comprising:
providing a vehicle that includes a pair of front wheels, a pair of rear wheels, a power unit, and a transmission connecting the power unit to at least one wheel of the front and rear wheels, the transmission including a plurality of forward drive ratios and at least one reverse drive ratio and a two speed gear reduction assembly configured to select between a high range drive ratio and a low range drive ratio when the transmission is in one of the plurality of forward drive ratios;
sensing, using a controller, a vehicle rollback condition when the vehicle transmission is configured in a forward drive ratio; and
the controller configured to execute the following functions:
decreasing torque distributed from the power unit of the vehicle to the at least one wheel, and actuating a brake, when the rollback condition is sensed;
executing drive ratio changeover from the high range drive ratio to the low range drive ratio after the decreasing of the torque and actuating of the brake; and
increasing torque distributed from the power unit of the vehicle to the at least one wheel and releasing the brake after the low range drive ratio has been engaged.

2. The method of claim 1, wherein sensing a vehicle rollback condition includes detecting vehicle speed with a vehicle speed sensor, and detecting vehicle acceleration with an acceleration sensor.

3. The method of claim 2, wherein sensing a rollback condition includes determining when drive ratio changeover from the high range drive ratio to the low range drive ratio is imminent according to a set of predetermined parameters including the vehicle speed, vehicle acceleration, and slope of a road surface supporting the vehicle.

4. The method according to claim 1, further comprising:
providing a controller in electrical communication with each of an actuator, a vehicle speed sensor, and a vehicle acceleration sensor,
wherein executing drive ratio changeover includes sending a signal from the controller to the actuator to cause the actuator to select one of the low range drive ratio and the high range drive ratio based on a signal from at least one of the vehicle speed sensor and the vehicle acceleration sensor.

5. The method according to claim 1, wherein sensing a rollback condition includes sensing slope of a road supporting the vehicle and determining if the slope of the road is greater than a predetermined threshold slope value.

6. The method according to claim 1, wherein sensing a rollback condition includes detecting a position of an accelerator pedal.

7. The method according to claim 1, wherein executing drive ratio changeover from the high range drive ratio to the low range drive ratio occurs automatically.

8. The method according to claim 1, wherein providing includes providing at least one of an audio message and a visual message within the vehicle when a vehicle rollback condition is sensed.

9. A vehicle anti-rollback system comprising:
a two-speed gear reduction assembly in series with a multi-ratio transmission assembly of the vehicle and at least one vehicle wheel,
the two-speed gear reduction assembly including a low range drive ratio and a high range drive ratio, and the multi-ratio transmission assembly including a reverse drive ratio and a plurality of forward drive ratios;
an actuator selectively movable between a low range position where the actuator couples the low range drive ratio in series with a selected one of the plurality of forward drive ratios and a high range position where the actuator couples the high range drive ratio in series with the selected one of the plurality of forward drive ratios;
a vehicle power unit connected to the multi-ratio transmission;
a vehicle speed sensor;
a vehicle acceleration sensor; and
a controller in electrical communication with each of the actuator, the vehicle speed sensor and the vehicle acceleration sensor and configured to execute the following functions:

sense a vehicle rollback condition according to a set of predetermined parameters including data from the vehicle speed sensor and the vehicle acceleration sensor; and cause a reduction in torque transfer from the power unit to the at least one vehicle wheel and actuate a vehicle brake system when the vehicle rollback condition is sensed.

10. The system according to claim 9, wherein the controller is also configured to cause the actuator to move to the low range position when the vehicle rollback condition is sensed and the controller has reduced torque transfer from the power unit to the at least one vehicle wheel and has actuated the vehicle brake system.

11. The system according to claim 9, wherein the set of predetermined parameters includes slope of a road supporting the vehicle, and the controller is also configured to sense the slope of the road supporting the vehicle and determine that the vehicle is experiencing the vehicle rollback condition if the slope of the road is greater than a predetermined threshold value for the slope of the road.

12. The system according to claim 9, wherein the set of predetermined parameters includes position of an accelerator pedal, and the controller is also configured to use data related to the position of the accelerator pedal in order to determine that the vehicle is experiencing the vehicle rollback condition.

13. The system according to claim 9 further comprising:
a warning message indicator configured to provide a visual or audio indication that an anti-rollback system is being initiated when the controller senses the vehicle rollback condition.

14. The system according to claim 9, wherein the controller is further configured to cause the actuator to move between the low range drive position and the high range drive position based on the set of predetermined parameters.

15. The system according to claim 14, wherein the predetermined parameters include an accelerator position, and the controller is configured to obtain data related to accelerator position and compare the data from the vehicle speed sensor, the data from the vehicle acceleration sensor, and the data related to accelerator position, with a corresponding threshold speed value, threshold acceleration value, and threshold accelerator position value to determine whether the vehicle is experiencing the vehicle rollback condition.

16. The system according to claim 15, wherein the controller is configured to cause the actuator to move to the low range position when:
vehicle speed is less than the threshold speed value;
accelerator position is greater than the threshold accelerator position; and
vehicle acceleration is less than the threshold acceleration value.

17. The system according to claim 15, wherein the controller is configured to cause the actuator to remain at the high range position when:
vehicle speed is at least equal to the threshold speed;
accelerator position is at most equal to the threshold position; and
vehicle acceleration is at least equal to the threshold acceleration.

18. A vehicle anti-rollback system comprising:
a two-speed gear reduction assembly in series with a multi-ratio transmission assembly of the vehicle and at least one vehicle wheel,
the two-speed gear reduction assembly including a low range drive ratio and a high range drive ratio, and the multi-ratio transmission assembly including a reverse drive ratio and a plurality of forward drive ratios;
an actuator selectively movable between a low range position where the actuator couples the low range drive ratio in series with a selected one of the plurality of forward drive ratios and a high range position where the actuator couples the high range drive ratio in series with the selected one of the plurality of forward drive ratios;
a vehicle power unit connected to the multi-ratio transmission assembly;
at least one vehicle parameter sensor; and
a controller in electrical communication with the vehicle parameter sensor and configured to execute the following functions:
sense a vehicle rollback condition, according to data received from the parameter sensor, in which the controller determines that the vehicle is likely to roll backwards while the multi-ratio transmission assembly is engaged in one of the plurality of forward drive ratios;
cause a reduction in torque transfer from the power unit to the at least one vehicle wheel and actuate a vehicle brake system when the vehicle rollback condition is sensed; and
cause the actuator to move to the low range position when the vehicle rollback condition is sensed and the controller has reduced torque transfer from the power unit to the at least one vehicle wheel and has actuated the vehicle brake system.

19. The system according to claim 18, wherein the at least one vehicle parameter sensor includes a vehicle speed sensor, a vehicle acceleration sensor, and a road slope sensor.

20. The system according to claim 18, wherein the multi-ratio transmission assembly is configured as a transaxle with all-wheel drive.

* * * * *